Patented Nov. 4, 1930

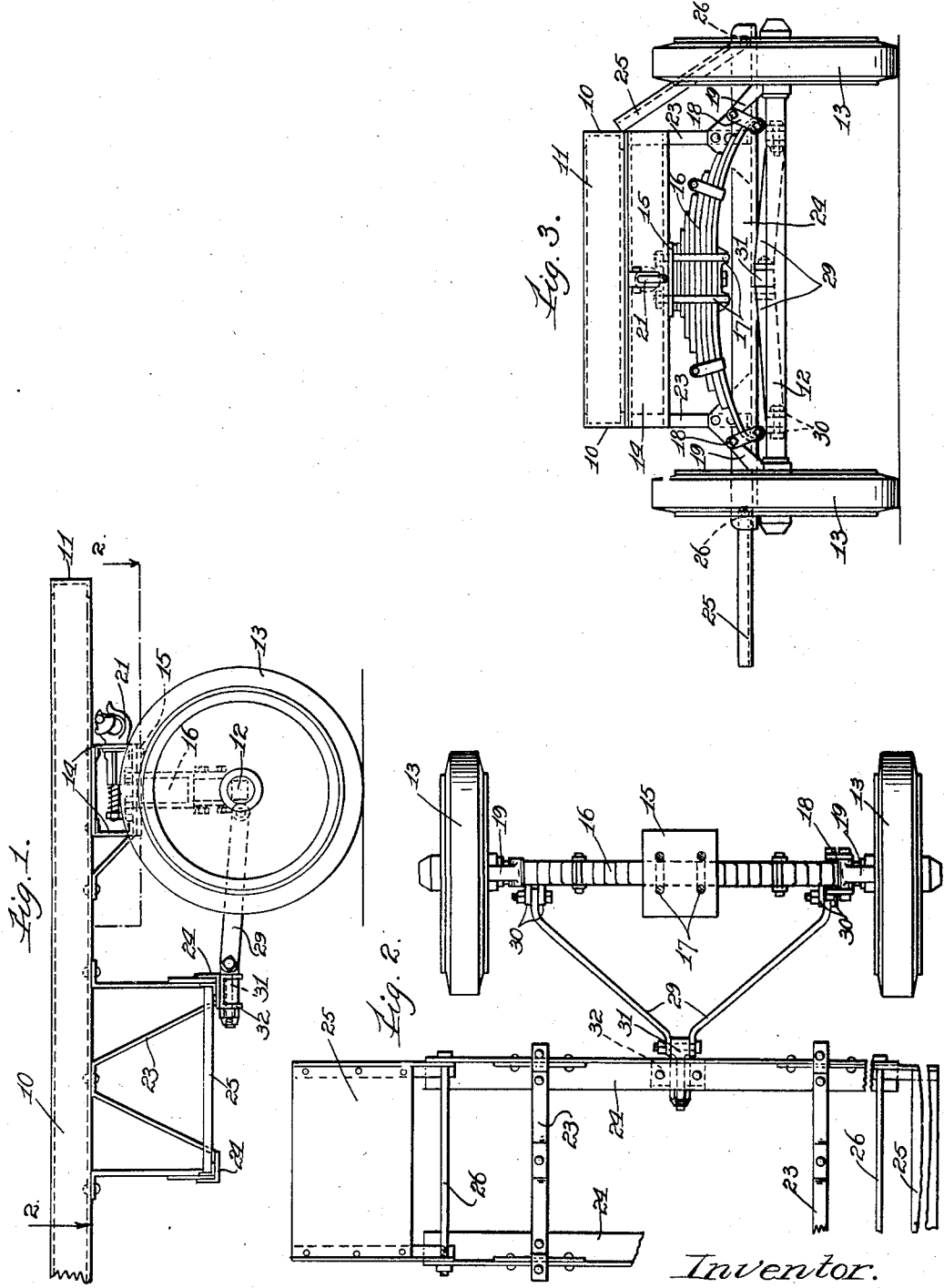

1,780,776

UNITED STATES PATENT OFFICE

LE ROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

TRAILER-FRAME STRUCTURE

Continuation of application Serial No. 186,837, filed April 27, 1927. This application filed January 11, 1928. Serial No. 245,843.

This application is a continuation of my application, Serial Number 186,837, filed April 27, 1927.

This invention relates to vehicles and has for its object to provide an improved frame structure. It consists in certain features and elements, in combination, as herein shown and described, as indicated by the claim.

In the drawings:

Figure 1 is a view in side elevation of a rearward portion of a vehicle embodying the present invention, with body removed.

Figure 2 is a horizontal view taken as indicated at line 2—2 on Figure 1, with one of the spring shackles omitted to show the radius rod connections to the axle.

Figure 3 is a rear end view of the vehicle, as shown in Figure 1.

For purposes of illustration my invention is shown in connection with a certain type of trailer vehicle, having a frame which includes a pair of longitudinally extending channel side members, 10, connected together in any suitable manner, and a rear end member, 11. It will be noted that the drawings merely show the rear portion of the vehicle. The rear end of the vehicle includes the usual fixed axle, 12, provided with wheels, 13, for supporting the vehicle. A pair of spaced, cross channels, 14, are secured to the lower flange of the side channels, 10, substantially over said axle and the lower flanges of channels, 14, are connected by a plate, 15, to which is secured a transversely extending semi-elliptic leaf spring, 16, by a pair of U-bolts, 17. The ends of said spring are perched on the axle by pivotal shackles, 18, connected to axle brackets, 19, on said axle, as shown in Figure 3.

The channel members, 14, also serve as a housing for a coupling pintle hook indicated at, 21, having its hook proper extending rearwardly beyond the rear channel, 14, to engage the draw bar of another trailer vehicle for pulling the same in a train.

W-shaped brackets, 23, are secured to the lower flange of the side members, 10, and are connected together by two transverse cross bars, 24, disposed on opposite sides of said brackets and having their ends extending therebeyond. These cross bars are preferably structural angle members, engaging the lower outside corners of the brackets, with the horizontal legs on the bottom and extending toward each other. Each side of the vehicle is provided with a step, 25, mounted for pivotal movement on a pin, 26, journaled in the upright legs of said angle cross members, 24, adjacent the ends. Said step is adapted to be supported in a horizontal position resting upon said inwardly extending horizontal legs of the angle members, 24. The pivotal support of the step permits folding the same upwardly, out of the way, as shown on the right hand side of the vehicle in Figure 3. The step enables the operator to observe the contents in the vehicle body (not shown) and also permits raising an object sufficiently high to clear the body sides in loading the vehicle body.

In vehicle construction of this type it is essential that the axle be additionally connected to the frame and for this purpose I provide a pair of radius rods, 29, each having one end pivotally mounted between a pair of lugs, 30, extending forwardly from said axle adjacent the wheels; the other ends of said rods converge toward each other and are pivotally connected to an eye bolt, 31, swivelled in a bracket, 32, secured on the underside of the lower leg of the rear cross angle, 24, centrally of the vehicle. It will be noted that this arrangement forms a triangular truss, positioned in approximately the horizontal plane of the axle, thus securing satisfactory operation in controlling axle movement during flexure of the spring.

I claim:

In a vehicle having a main frame and supporting wheels and axles therefor, a pair of brackets depending from said frame on opposite sides thereof adjacent to and forwardly of the rear wheels, a pair of spaced transversely extending cross bars connecting said brackets together, a step pivotally connected to said cross-bars at one side of the vehicle, normally extending in horizontal position and adapted to be swung upwardly when out of use, an eye bolt swivelly mounted on the cross bar which is adjacent the rear wheels, and a pair of short radius rods each having one end connected to the rear axle, their other ends converging toward each other and pivotally connected to said eye bolt.

LE ROY E. WILLIAMS.